(12) United States Patent
Prunet et al.

(10) Patent No.: US 10,534,010 B2
(45) Date of Patent: Jan. 14, 2020

(54) ENERGY-EFFICIENT HOME-AUTOMATION DEVICE AND METHOD FOR TRACKING THE DISPLACEMENT OF A MONITORED OBJECT

(71) Applicant: MYFOX, Labege (FR)

(72) Inventors: Jean-Marc Prunet, Paris (FR); Jean-Yves Fourniols, Quint-Fonsegrives (FR); Franck Nieceron, Castanet-Tolosan (FR)

(73) Assignee: MYFOX, Labege (FR)

( * ) Notice: Subject to any disclaimer, the term of this patent is extended or adjusted under 35 U.S.C. 154(b) by 506 days.

(21) Appl. No.: 15/319,982

(22) PCT Filed: Jun. 17, 2015

(86) PCT No.: PCT/EP2015/063548
§ 371 (c)(1),
(2) Date: Dec. 19, 2016

(87) PCT Pub. No.: WO2015/193349
PCT Pub. Date: Dec. 23, 2015

(65) Prior Publication Data
US 2017/0138979 A1  May 18, 2017

(30) Foreign Application Priority Data

Jun. 20, 2014  (FR) ..................... 14 55707

(51) Int. Cl.
*G01P 13/00*  (2006.01)
*G08B 13/08*  (2006.01)
(Continued)

(52) U.S. Cl.
CPC .............. *G01P 13/00* (2013.01); *G01C 21/08* (2013.01); *G01P 15/18* (2013.01); *G08B 13/08* (2013.01);
(Continued)

(58) Field of Classification Search
None
See application file for complete search history.

(56) References Cited

U.S. PATENT DOCUMENTS 4,095,173 A * 6/1978 Darrel ..................... G01H 1/00
324/535
6,940,405 B2 * 9/2005 Script ..................... G01P 13/00
310/311
(Continued)

FOREIGN PATENT DOCUMENTS

DE        4033765 A1 *  4/1992  ....... B60G 17/01908
EP      1 981 010 A2    10/2008
(Continued)

OTHER PUBLICATIONS

International Search Report, dated Sep. 24, 2015, from corresponding PCT application.

*Primary Examiner* — Tung S Lau
(74) *Attorney, Agent, or Firm* — Young & Thompson

(57) ABSTRACT

Disclosed is a home-automation device including a displacement detector for a monitored object, an accelerometer, an orientation sensor, a memory, a processing unit. The processing unit is programmed to calculate, upon detection of an event, a displacement energy of the detector from the acceleration signals acquired during a waiting time after the triggering event.

20 Claims, 4 Drawing Sheets

Figure 1:
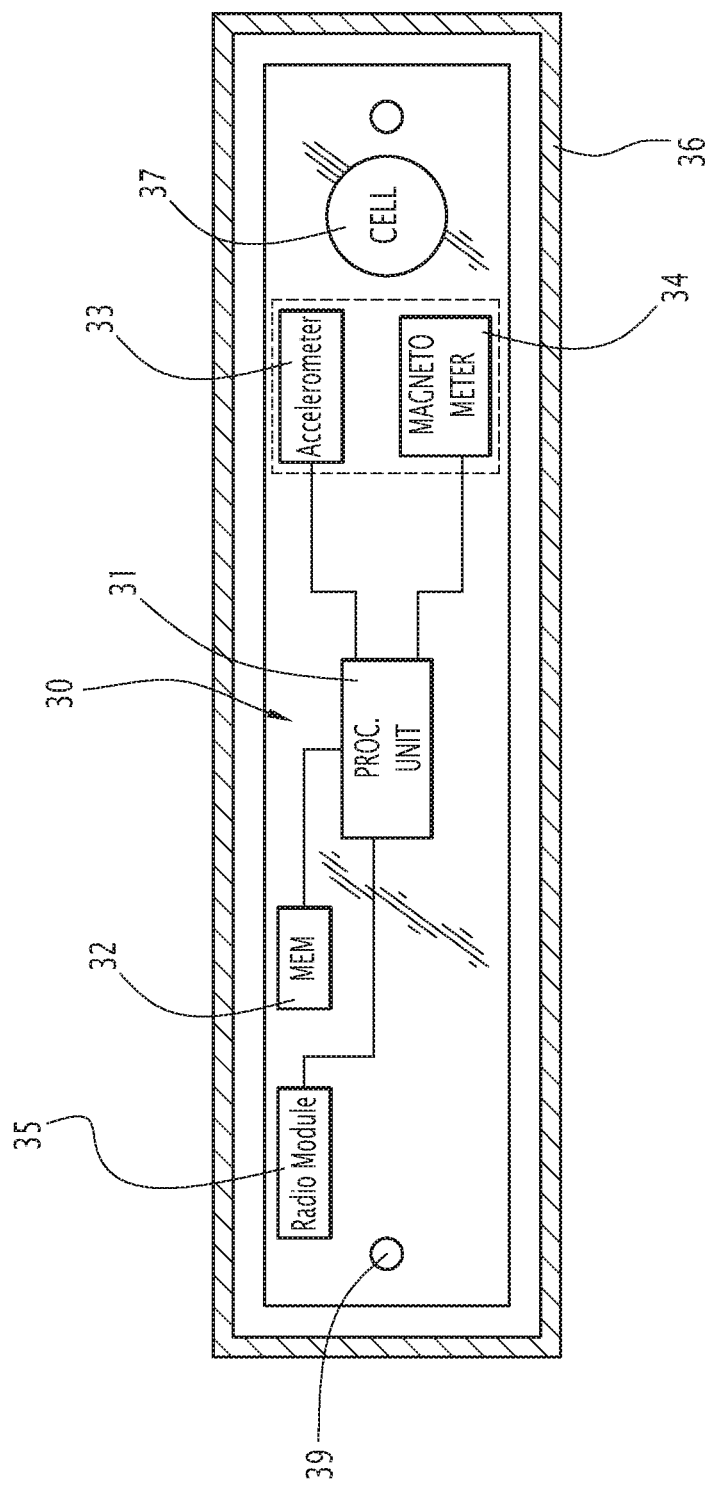

(51) Int. Cl.
*G08B 29/18* (2006.01)
*G01C 21/08* (2006.01)
*G01P 15/18* (2013.01)
*H04L 12/28* (2006.01)
*G05B 11/01* (2006.01)

(52) U.S. Cl.
CPC ........ *G08B 29/181* (2013.01); *H04L 12/2823* (2013.01); *G05B 11/01* (2013.01)

(56) References Cited

U.S. PATENT DOCUMENTS

| | | | | |
|---|---|---|---|---|
| 7,306,567 | B2 * | 12/2007 | Loree, IV | A61B 5/103 |
| | | | | 600/587 |
| 2006/0194181 | A1 * | 8/2006 | Rosenberg | G09B 5/06 |
| | | | | 434/317 |
| 2008/0269031 | A1 * | 10/2008 | Lee | B21D 28/002 |
| | | | | 483/7 |
| 2010/0019902 | A1 * | 1/2010 | Mullet | G08B 13/08 |
| | | | | 340/546 |
| 2010/0096463 | A1 * | 4/2010 | Perera | G06K 7/0004 |
| | | | | 235/470 |
| 2013/0000406 | A1 * | 1/2013 | Parsadayan | E05F 15/611 |
| | | | | 73/514.39 |
| 2013/0057405 | A1 * | 3/2013 | Seelman | G08B 29/185 |
| | | | | 340/545.2 |
| 2014/0309882 | A1 * | 10/2014 | Antchak | F02B 67/06 |
| | | | | 701/36 |
| 2016/0163166 | A1 * | 6/2016 | Prunet | G08B 13/08 |
| | | | | 340/547 |

FOREIGN PATENT DOCUMENTS

| | | | | |
|---|---|---|---|---|
| EP | | 1981010 A2 * | 10/2008 | ............ G08B 13/06 |
| WO | | 2007/048908 A1 | 5/2007 | |
| WO | WO-2007048908 A1 * | | 5/2007 | ............ G01P 13/00 |

* cited by examiner

Finished

ENERGY-EFFICIENT HOME-AUTOMATION DEVICE AND METHOD FOR TRACKING THE DISPLACEMENT OF A MONITORED OBJECT

The invention relates to a device allowing the detection of the displacement of an object, named monitored object, in a reliable manner. The invention allows in particular tracking of the position of a leaf.

Throughout the text, the term "displacement" means either the movement of a monitored object which causes it to change position, or the result of this movement, i.e. the position—in particular the momentary position with respect to a reference position—of this monitored object. The term "displacement" thus relates to the position and/or speed and/or acceleration (including impacts) of a monitored object.

The monitoring of the displacement of an object, in particular of a leaf, is essential in a home-automation device. This is particularly the case in an alarm device preventing intrusions and break-ins. It is necessary in particular that the position of a leaf be determined at any moment, in particular when the home-automation alarm device is armed, or following a break-in.

WO2007/048908 describes a method of processing acceleration measurements issued by an accelerometer and its application to an alarm system. This method, which is based only on acceleration signals, does not allow different types of displacement of the monitored object to be distinguished in a reliable manner with respect to whether or not it is necessary to emit alarm signals, in particular if the displacement of a monitored object corresponds or not to a successful break-in relating to the monitored object.

US2010/0019902 describes a portable security system comprising a sensing unit having a position detector and an activity detector allowing the sensing unit's own movement or an activity to be detected. The position detector can comprise a digital compass, an analogue compass, a two-axis compass, a tilt switch and/or a multi-axis accelerometer for detecting changes in the angular position and/or in the linear movement of a window or door. The activity detector can also comprise an accelerometer. This system also does not allow different types of displacement of the monitored object to be distinguished in a reliable manner with respect to whether or not it is necessary to emit alarm signals, in particular if the displacement of a monitored object corresponds or not to a successful break-in relating to the monitored object.

EP 1981010 describes a method for detecting a break-in relating to a door lock by detecting the received energy and analysing same with respect to an energy signature. This method, which is based only on a particularly complex analysis of energy, also does not allow different types of displacement of the monitored object to be distinguished in a reliable manner with respect to whether or not it is necessary to emit alarm signals, in particular if the displacement of a monitored object corresponds or not to a successful break-in relating to the monitored object.

US 2013/0057405 describes the use of an accelerometer and/or a gyroscope and asserts that the integration of signals issued by these detectors would allow the position of a door or window to be determined, which is not true in the absence of an initial position reference. Furthermore, this method, which is based only on accelerometer signals, also does not allow different types of displacement of the monitored object to be distinguished in a reliable manner with respect to whether or not it is necessary to emit alarm signals, in particular if the displacement of a monitored object corresponds or not to a successful break-in relating to the monitored object.

U.S. Pat. No. 6,940,405 describes an alarm system which combines a magnetic field sensor with an inertial sensor. Thus, the displacement of a pivoting object can be detected either by detecting a momentary acceleration of the object corresponding to an opening and/or to impacts, or—when an abnormal acceleration is not detected by the inertial sensor (i.e. in the presence of a slow displacement of the object)—by detecting a change in orientation of the object by the magnetic field sensor.

In order to be adapted to a use as a detector of a home-automation device, such detectors must be as discrete and lightweight as possible, while remaining cost-favourable and with a low energy consumption in order to be autonomous.

However, the magnetometers available for this type of application consume a relatively large amount of energy which makes them less compatible with the need to be discrete, lightweight and to be supplied with energy by a cell or a battery, in particular a cell with small dimensions.

The invention thus aims to overcome these disadvantages.

The invention aims to propose a device which requires little energy and which is thus autonomous in terms of energy.

The invention likewise aims to propose such a device which is not bulky, not costly, yet still reliable.

The invention aims to propose a home-automation device and a method for operating a displacement detector of such a home-automation device allowing different types of displacement of the monitored object to be distinguished in a reliable manner with respect to whether or not it is necessary to emit alarm signals, in particular if the displacement of a monitored object corresponds or not to a successful break-in relating to the monitored object.

It aims in particular to propose a home-automation device and a method for operating a displacement detector of such a home-automation device allowing the reliable determination of whether a monitored object is displaced or has been displaced with respect to a reference orientation, in particular if it has been displaced following an impact.

The invention aims in particular to propose a home-automation device allowing the determination of whether a leaf is open or closed.

The invention further aims to propose a device which can monitor a plurality of pivoting leaves in any type of location.

The invention also aims to propose a method for operating a displacement detector of such a home-automation device, allowing the energy consumed by said displacement detector to be limited.

In accordance with a first aspect, the invention thus relates to a home-automation device comprising at least one displacement detector for an object, named monitored object, comprising:
  a housing,
  an accelerometer fixed to the housing and adapted to provide signals, named acceleration signals, representing an acceleration of the housing in at least one fixed direction of the housing,
  an orientation sensor fixed to the housing and adapted to provide signals, named orientation signals, representing a momentary orientation of at least one fixed direction of the housing,
  a memory comprising data representing:
    at least one predetermined value, named triggering value, at least one predetermined value, named scaling value,
a unit for processing the acceleration signals and orientation signals, characterised in that the processing unit is programmed to:
be able to identify a predetermined event, named triggering event, representing a variation in the acceleration of the housing, at least from the acceleration signals and said triggering value,
upon detection of a triggering event:
perform, at least from the acceleration signals, a calculation for determining a value, named displacement energy, said calculation comprising at least one sum of accelerations over time,
after a set time, named waiting time, from the triggering event has passed, acquire orientation signals provided by the orientation sensor representing the momentary orientation, named final orientation, of the housing,
compare said displacement energy to said scaling value.

In accordance with another aspect, the invention relates to a home-automation device comprising at least one displacement detector for an object, named monitored object, comprising:
a housing,
an accelerometer fixed to the housing and adapted to provide signals, named acceleration signals, representing an acceleration of the housing in at least one fixed direction of the housing,
an orientation sensor fixed to the housing and adapted to provide signals, named orientation signals, representing a momentary orientation of at least one fixed direction of the housing,
a memory comprising data representing:
at least one predetermined value, named triggering value,
at least one predetermined value, named scaling value,
a unit for processing the acceleration signals and orientation signals, characterised in that the processing unit is programmed to:
be able to identify a predetermined event, named triggering event, representing a variation in the acceleration of the housing, at least from the acceleration signals and said triggering value,
upon detection of a triggering event:
acquire orientation signals provided by the orientation sensor representing the momentary orientation, named initial orientation, of the housing,
perform, at least from the acceleration signals, a calculation for determining a value, named displacement energy, said calculation comprising at least one sum of accelerations over time,
after a set time, named waiting time, from the acquisition of the initial orientation has passed, acquire orientation signals provided by the orientation sensor representing the momentary orientation, named final orientation, of the housing,
compare said displacement energy to said scaling value.

In accordance with another aspect, the invention relates in particular to a home-automation device comprising at least one displacement detector for an object, named monitored object, comprising:
a housing,
an accelerometer fixed to the housing and adapted to provide signals, named acceleration signals, representing an acceleration value of the housing in at least one fixed direction of the housing,
an orientation sensor fixed to the housing and adapted to provide signals, named orientation signals, representing a momentary orientation of at least one fixed direction of the housing,
a memory comprising data representing at least one predetermined acceleration value, named triggering value,
a unit for processing the signals provided by the accelerometer and by the orientation sensor, characterised in that the processing unit is programmed to:
compare each acceleration value to said triggering value,
upon detection of an acceleration value greater than said triggering value:
calculate a displacement energy factor of the detector from the acceleration signals,
immediately after the calculation of the displacement energy factor, acquire orientation signals provided by the orientation sensor representing the momentary orientation, named final orientation, of the housing.

Said memory is advantageously adapted to be able to store data, in particular digital data. In a device in accordance with the invention, said memory may comprise one or more memory units of the same type of or different types. The processing unit is particularly adapted to store data representing values, in particular acceleration and/or orientation values, in said memory. The triggering value is advantageously stored in a memory in the form of digital data.

The memory of the processing unit is also adapted to store data representing instructions on how to operate the processing unit.

The processing unit advantageously comprises means for processing digital data. The processing unit comprises, for example, at least one microprocessor and/or at least one microcontroller.

The processing unit is programmed to perform operations—in particular comparisons—from the signals supplied to it and values stored in said memory. Some of these operations performed by the processing unit correspond in the nature and logic sequence thereof to the identification of a predetermined triggering event.

In addition, advantageously and in accordance with the invention, the processing unit is programmed to acquire:
acceleration signals provided by the accelerometer at a first sampling rate, named accelerometer rate,
orientation signals provided by the orientation sensor at a second sampling rate, named low rate, with a value less than said accelerometer rate.

The invention thus allows a displacement detector to be obtained which is very energy-efficient. In fact, the acquisition rate, named low rate, of the orientation signals can be selected to be particularly low so as to save as much of the energy consumed by such a detector as possible.

The majority of the monitored objects are, in fact, stationary most of the time, such that there is no point in wasting energy monitoring their position at a very high rate.

Nevertheless, a displacement detector remains particularly reliable for detecting the displacement of an object. In fact, within the scope of the invention, in the case of a very slow displacement (below the threshold of detection by an accelerometer) of the monitored object, the low rate of the orientation sensor is selected to allow the detection of a change in orientation of the object.

To this end, the low rate is advantageously selected to be between 0.05 Hz and 4 Hz, in particular between 0.2 Hz and 2 Hz. In the case of a monitored object such as a leaf (of a door or window), the low rate is advantageously of the order of 0.2 Hz.

Although a displacement of the monitored object quicker than the low rate (e.g. quick opening followed by quick closing of a leaf) could not be detected from the orientation signals provided by the orientation detector acquired at the low rate, the acceleration signals provided by the accelerometer, for their part, allow such a quick displacement to be detected because the acceleration of the object is high in that case. The sampling rate, named accelerometer rate, of the accelerometer is advantageously selected to be higher than the low sampling rate of the orientation sensor. In fact, an accelerometer currently consumes less energy than an orientation sensor such as a magnetometer for example.

The accelerometer rate is advantageously selected to be between 2 Hz and 60 Hz, more particularly between 2 Hz and 5 Hz.

Furthermore, advantageously and in accordance with the invention, the processing unit is programmed to acquire, upon detection of a triggering event, orientation signals provided by the orientation sensor at a third sampling rate, named high rate, with a value greater than said low rate for acquiring orientation signals.

The high rate is selected to be able to track the orientation of the monitored object in a precise manner. To this end, the high rate is advantageously selected to be between 1 Hz and 100 Hz, more particularly between 30 Hz and 80 Hz, in particular of the order of 50 Hz. Therefore, whilst the object is stationary, the displacement detector consumes little energy. In contrast, when a displacement of the object is detected by virtue of the accelerometer, a device in accordance with the invention monitors the displacements of the object in an extremely precise manner.

Advantageously and in accordance with the invention, the processing unit is programmed to acquire, upon detection of a triggering event, acceleration signals provided by the accelerometer at a fourth sampling rate, named alert rate, with a value greater than said accelerometer rate.

Therefore, the acceleration measurements are also more precise and allow a more precise evaluation of the displacement energy.

Said alert rate is advantageously between 5 Hz and 50 Hz, particularly between 15 Hz and 30 Hz, more particularly advantageously of the order of 25 Hz.

Advantageously and in accordance with the invention, the processing unit is programmed to be able to identify a triggering event in which the acceleration signals represent an acceleration value greater than a predetermined triggering value.

Detecting an acceleration with a value greater (in amplitude) than the triggering value advantageously triggers immediate acquisition of the orientation signals of the orientation sensor independently of said low rate. Detecting an acceleration with an absolute value greater than the triggering value allows in particular an impact on the monitored object to be detected.

As a variant or in combination, there is nothing to prevent the triggering event from being identified by comparing other factors representing a variation in acceleration with a triggering value: first time derivative of the acceleration approximated, for example, by a difference between two successive measurements, integral or sum of accelerations over time, etc.

As a variant or in combination in accordance with the invention, the processing unit can be programmed to compare one or more acceleration values with one or more triggering values, e.g. so as to detect a predetermined triggering event which can be recognised from a profile of the acceleration signals. In particular, a predetermined triggering event can correspond to a particular profile of values of and/or variations in the acceleration, wherein the detection is based on a series of comparisons of the acceleration values with different triggering values, if need be at predetermined time intervals.

In addition, as a variant or in combination in accordance with the invention, the processing unit can be programmed to compare the acceleration values with several distinct triggering values, each triggering value being selected based on a predetermined criterion. Such a predetermined criterion is, for example, the displacement direction of the monitored object, e.g. the translation direction of a sliding leaf. Each triggering value is thus adapted to the specific nature of the movement under investigation.

The orientation signals corresponding to the initial orientation and to the final orientation can be acquired in an ad hoc fashion independently of and in addition to the acquisitions performed at said low rate, or can be selected from among the acquisitions performed at said high rate.

Therefore, even prior to calculating the energy of the impact or of the displacement detected from the acceleration signals, the processing unit acquires orientation signals allowing it to determine the momentary initial orientation of the housing and stores same in a memory. The processing unit determines said initial orientation from said orientation signals.

Similarly, after a set time, named waiting time, from the acquisition of the initial orientation has passed, in particular after said waiting time from the triggering event, the processing unit immediately acquires orientation signals allowing it to determine the momentary final orientation of the housing and stores same in a memory. The processing unit determines said final orientation from said orientation signals.

Said waiting time can be, for example, stored in the memory. Said waiting time can be selected based on the type of object being monitored: for example, in the case of a leaf, it is selected to be less than a minimum time for opening and then closing the leaf, allowing a person to pass through whilst the door is open. In the case of a leaf, said waiting time is, for example, advantageously between 0.1 seconds and 2 seconds, in particular between 0.5 seconds and 1.5 seconds.

Said waiting time corresponds advantageously and in accordance with the invention to the processing time, by the processing unit, of the acceleration signals allowing said displacement energy to be determined.

Advantageously and in accordance with the invention, the processing unit is programmed to determine the initial orientation:
  by determining a plurality of orientations from orientation signals acquired at a high rate just after detecting an acceleration value greater than the triggering value, then by
  averaging this plurality of orientations to obtain said initial orientation.

The processing unit is advantageously programmed to determine the final orientation in the same manner.

The initial and final orientations are thus particularly reliable because the act of averaging a plurality of measurements allows a particular incorrect measurement of the orientation to be ignored.

In addition, advantageously and in accordance with the invention, the processing unit is programmed to acquire, upon detection of a triggering event, orientation signals provided by the orientation sensor representing the momentary orientation, named initial orientation, of the housing, and to compare said final orientation and said initial orientation.

Depending upon whether the result of the comparison between the initial orientation and the final orientation is zero or non-zero, the processing unit can determine whether or not the acceleration(s) (e.g. an impact) to which the monitored object is subjected have resulted in the displacement of the monitored object. This will, or will not, allow the result of the comparison between the displacement energy and the scaling value to be corroborated.

Advantageously, the processing unit is programmed to compare the result of the difference between the final orientation and the initial orientation with a predetermined threshold value stored in a memory. This allows minor displacements of the monitored object between the initial orientation and the final orientation, possibly due to small variations in the local magnetic field or to a minor displacement of the object (for example due to a mounting clearance of a leaf on a frame) to be disregarded.

Advantageously and in accordance with the invention, the processing unit determines the sign of the difference between the initial orientation and the final orientation.

The sign, positive or negative, of the difference between the initial orientation and the final orientation allows the processing unit to determine the direction in which the monitored object has been displaced. More particularly, when the monitored object is a leaf, this allows the determination as to whether the leaf has been opened or has been closed by the acceleration(s) (and/or impacts) to which the leaf has been subjected; this allows in particular its precise position following the occurrence of such a triggering event to be identified.

The processing unit is adapted to produce signals representing messages intended for another electronic device or a human user, comprising information relating to the comparison between the final orientation and the initial orientation and/or to the comparison of the difference between the final orientation and the initial orientation and a threshold value and/or between the energy value and one or more predetermined energy values. Advantageously, if the difference between the initial orientation and the final orientation is greater than said threshold value, the processing unit produces a message intended for another device such as a central alarm unit and/or intended for a human/machine interface.

Therefore, in a device in accordance with the invention, the detection of a displacement by processing acceleration signals provided by the accelerometer can be confirmed by detecting a displacement by processing orientation signals provided by the orientation sensor. The invention allows a displacement detector to be obtained which allows the reliable differentiation between one or more impacts received by the monitored object without displacement thereof, which corresponds for example to an unsuccessful attempt to break-in at a door, and one or more impacts received by the monitored object which result in displacement thereof, which corresponds for example to a break-in with the door being opened. The invention also allows a displacement detector to be obtained which is particularly reliable when monitoring the displacements of a monitored object, e.g. within the scope of monitoring a door of premises in which children are located.

The processing unit is programmed to calculate, upon detection of a triggering event, said displacement energy at least from the acceleration signals provided by the accelerometer. More particularly, the processing unit is programmed to calculate said displacement energy from the acceleration signals acquired during a predetermined time period, named calculating time, after the detection of an acceleration value greater than the triggering value.

WO2007/048908 describes exemplified methods for processing acceleration signals of the accelerometer which can be implemented within the scope of the present invention. Applying an odd function to the acceleration signals allows in particular the selection of acceleration signals representing accelerations only in one set direction along a measuring path and to remove accelerations in an opposite direction along the same measuring path.

Advantageously and in accordance with the invention, calculation of said displacement energy comprises a quadratic sum of accelerations over time.

Advantageously and in accordance with the invention, calculating said displacement energy comprises:
- a moving acceleration average from a plurality of acceleration signals,
- a difference between the moving acceleration average and a predetermined value, named continuous value, stored in the memory in the form of data,
- a quadratic sum of a plurality of differences between a plurality of time-offset moving acceleration averages and said continuous value.

"Quadratic sum" means a sum of squared terms.

More particularly, calculating said displacement energy comprises an operation of the type:

$$E_{dep} = \sqrt{(A_x^2 + A_y^2 + A_z^2)}$$

where
Ax, Ay and Az are values calculated on each measuring axis of an accelerometer with three axes such that:

$$A_x = \sum_{i=1}^{p} \left( \left( \frac{1}{n} \sum_{j=0}^{n-1} x_{i-j} \right) - REFx \right)^2$$

where
$x_i$ are successive acceleration values on a measuring axis x at a given sampling rate, to which an odd function has been applied,
p and n are predetermined integers,
REFx is a predetermined value for the axis x, stored in the memory.

The values REFx, REFy and REFz advantageously correspond to the local gravitational values on each of the measuring axes of an accelerometer with three measuring axes.

The integer n is selected to perform a moving average over n accelerating measuring points. Said moving average allows vibrations measured by the accelerometer to be filtered.

The integer p corresponds to a number of summed values, thus to a time, named calculating time, based on the sampling rate, during which acceleration signals are acquired in order to determine said displacement energy.

The equations shown are similar in the case of an accelerometer with two measuring axes or one measuring axis.

The calculating time Tcal is equal to:

$$Tcal = \frac{p}{f_{ac}}$$

where p is said integer, $f_{ac}$ is the acquisition rate of the acceleration signals.

The integer p or the calculating time Tcal is stored in the memory. In the case of a leaf, said acquisition rate $f_{ac}$ is advantageously said alert rate.

Advantageously and in accordance with the invention, said waiting time is selected to be equal to said calculating time.

Said displacement energy is a value representing an amount of energy received by the monitored object during the calculating time in at least one direction on at least one measuring path, although this is not necessarily physically homogeneous to an energy. Said displacement energy is a value representing cumulative accelerations owing to an impact and/or accelerations to which the monitored object is subjected during said calculating time.

Advantageously and in accordance with the invention, the processing unit is programmed to compare said displacement energy with a predetermined value, named scaling value. The processing unit of a displacement detector is programmed to compare the thus obtained value, named displacement energy Edep, calculated from acceleration values, with a predetermined value, named scaling value, stored in the memory. Advantageously and in accordance with the invention, said scaling value is adapted such that a displacement energy value greater than said scaling value corresponds to an impact—in particular a successful break-in—on the monitored object, e.g. a break-in with a leaf being opened. Said scaling value is advantageously adapted based on the monitored object.

Said scaling value is advantageously stored in a memory in the form of digital data.

The scaling value corresponds, for example, to the result of a calculation of displacement energy for an impact of a given intensity.

Advantageously and in accordance with the invention,
the memory comprises data representing a plurality of predetermined distinct scaling values,
the processing unit is programmed to compare said displacement energy with a plurality of scaling values.

Thus, said displacement energy can be graded on a scale of predetermined values so as to quantify the intensity thereof. The processing unit is advantageously programmed to be able to produce and send signals representing a message based on the level of said displacement energy. Said message advantageously contains information relating to the level of said displacement energy. Thus, within the scope of a home-automation alarm device, an attack on a monitored object can be graded on a scale of values and allow a distinction to be made between an unsuccessful break-in attempt and a successful break-in.

Advantageously and in accordance with the invention, the processing unit is programmed to perform an operation, named correlating operation, comprising at least one comparison of the result of the comparison between the final orientation and the initial orientation, and the result of the comparison between said displacement energy and a plurality of scaling values.

Thus, although the result of the comparison between said displacement energy and at least one scaling value is generally sufficient to determine whether or not a monitored object has been displaced, the acquisition of the initial and final orientations and the comparison between the final orientation and the initial orientation allow the definite confirmation of whether or not a monitored object has been displaced as well as confirmation of the direction in which it has been displaced. In particular, in the case of a leaf, the displacement energy can exceed a set threshold as a result of a plurality of impacts which are close together (within the calculating time) but each having an intensity which is too low to cause the break-in opening of the leaf: from then, the measurement of the initial orientation and of the final orientation allows the information given by the displacement energy to be invalidated and allows the home-automation device and/or a user to know that the position of the leaf has not changed (and that the leaf has remained closed, for example).

Advantageously and in accordance with the invention, the orientation sensor comprises a magnetometer fixed to the housing and adapted to provide orientation signals representing the momentary orientation of at least one fixed direction of the housing with respect to a local terrestrial magnetic field.

A displacement detector in accordance with the invention is thus adapted to measure the orientation of an object with respect to the direction of the local terrestrial magnetic field. A displacement detector in accordance with the invention is thus adapted to measure the orientation of an object with respect to a reference orientation, stored in the memory, with respect to the direction of the local terrestrial magnetic field (for example, the orientation of a closed door on its frame).

Processing the orientation signals provided by the magnetometer indicating the orientation of the housing of the displacement detector with respect to the direction of the local terrestrial magnetic field allows the angular position of a monitored object, to which said housing is fixed, to be deduced with respect to a known reference angular position which corresponds to a stored orientation of the monitored object with respect to the direction of the local terrestrial magnetic field.

In addition, advantageously and in accordance with the invention, the magnetometer is a magnetometer with three axes adapted to provide orientation signals representing the momentary orientation of three fixed directions of the housing with respect to the direction of the local terrestrial magnetic field.

A magnetometer with three axes allows in particular the detection of the orientation of a leaf pivoting about any axis with a reference to Earth. Such a magnetometer allows the detection of the orientation of a leaf with respect to the direction of the terrestrial magnetic field, more precisely with respect to the direction of the local magnetic field which may be slightly different from the direction of the Earth's magnetic north or magnetic south owing to local disruptions in the magnetic field as a result of, for example other components of the displacement detector or the electromagnetic environment in which the displacement detector is installed. An orientation sensor comprising such a magnetometer is particularly adapted for leaves which are mounted to rotate about a vertical axis. However, it also allows the detection of the orientation of a leaf pivoting about a horizontal axis with respect to a frame, or about any inclined axis with respect to a frame.

In addition, the magnetometer is advantageously a miniature magnetometer, for example of the magnetometer integrated circuit-type. Similarly, the accelerometer is advantageously miniaturised.

Advantageously and in accordance with the invention, the accelerometer is an accelerometer with three axes adapted to provide acceleration signals representing momentary acceleration measurements of the housing with a reference to Earth.

Advantageously, the accelerometer or processing unit corrects the influence of the gravitational acceleration on Earth.

In accordance with the invention, a single component providing the function of a magnetometer and an accelerometer can be chosen.

In addition, advantageously and in accordance with the invention, the displacement detector further comprises means for wirelessly emitting signals.

More particularly, the displacement detector advantageously comprises means for wirelessly emitting signals in a proximity wireless communications protocol, i.e. able to reach a maximum distance of less than 200 m, e.g. a Wi-Fi communications protocol.

Alternatively or in combination, the displacement detector comprises means for wirelessly emitting signals in a wide-area wireless communications protocol, i.e. able to reach a maximum distance of greater than 200 m, e.g. a GSM, GPRS, UMTS communications protocol or the like, able to implement the invention.

Advantageously and in accordance with the invention, the displacement detector is adapted to be able to produce and wirelessly emit signals representing the orientation of the object, in particular a change in the orientation of the housing with respect to a previous state.

The processing unit of each displacement detector is adapted to be able to emit messages, named state messages, representing at least the orientation of a monitored object to which said displacement detector is fixed. For example, the processing unit of the displacement detector is adapted to send state messages representing an "open" state, a "closed" state or an "in movement" state of the leaf.

A device in accordance with the invention is also advantageously characterised in that it comprises a central processing unit adapted to wirelessly receive signals emitted by a displacement detector. Such a central processing unit is particularly adapted to be able to receive proximity wireless signals.

Advantageously, a home-automation device in accordance with the invention comprises at least one central processing unit and a plurality of displacement detectors in accordance with the invention. Thus, a plurality of displacement detectors can be arranged in premises to be monitored, and the central processing unit receives and processes state messages emitted by each displacement detector.

In certain embodiments of the invention, each displacement detector is adapted to be able to directly emit signals forming state messages to a remote antenna of a wide-area telecommunications network. This variant is useful in particular when the home-automation device in accordance with the invention does not have a central processing unit.

The central processing unit comprises a programming memory adapted so that the central processing unit can operate in a plurality of operating modes.

In particular, advantageously and in accordance with the invention, the central processing unit is adapted to be able to operate in a first operating mode, named passive mode. In the case of a home-automation alarm device preventing intrusions and break-ins, the passive mode corresponds to an operating mode without monitoring and without triggering of alarm means.

Likewise, advantageously and in accordance with the invention, the central processing unit can advantageously be adapted to be able to operate in a second operating mode, named active mode, in which the central processing unit can active alarm means, based on at least one message received from a displacement detector and/or other detectors with which it is communicating.

In the case of a home-automation alarm device preventing intrusions and/or break-ins, the active mode corresponds to an operating mode with monitoring and triggering of alarm means if an intrusion and/or attempted break-in and/or break-in event is detected. The central processing unit can, for example, be adapted to emit a signal for triggering an alarm siren, to emit an alert message to a user and/or a remote monitoring company, to emit signals for triggering other devices (to close doors, start video-monitoring, activate a tear gas diffuser, . . . ), etc.

A home-automation device in accordance with the invention is not necessarily an alarm device and can have other home-automation applications which are distinct from, or combined with, the alarm application. For example, a device in accordance with the invention can enable the temperature of premises to be controlled (by having knowledge of the state of the leaves of these premises), people (children, pensioners, . . . ) to be monitored, etc.

Advantageously and in accordance with the invention, the central processing unit comprises at least one memory adapted to be able to store data representing a position of each monitored object. For example, the data stored in such a memory can represent an "open" or "closed" state of a leaf. The data representing the state of the position of a monitored object can be modified upon receipt of a message emitted by a displacement detector.

Thus, advantageously and in accordance with the invention, if when passing from a passive mode to an active mode of the central processing unit, the central processing unit receives at least one signal representing the fact that a leaf is not in its reference orientation (e.g. "closed"), the central processing unit emits an information signal. Such an information signal can be emitted to a user interface (screen, loudspeaker, . . . ) and/or to a terminal (telephone, control panel of the home-automation device, . . . ). Thus, a device in accordance with the invention allows, for example, a user to be warned that a window of his home is still open when he is leaving his home and activates his home-automation alarm device.

Furthermore, advantageously and in accordance with the invention, the central processing unit can, upon request by a user, emit an information message containing the state of all the leaves monitored by displacement detectors which can communicate with the central processing unit.

Advantageously, the processing unit of a displacement detector operates in the same manner regardless of the operating mode (passive/active) of the central processing unit.

In order to be simpler and more economical, a displacement detector in accordance with the invention can be adapted only to emit wireless signals, without being able to receive them.

Alternatively, a displacement detector in accordance with the invention can be adapted to communicate by emitting and receiving—in particular with the central processing unit—and to emit signals upon receipt of a request—in particular emitted by the central processing unit. Thus, a displacement detector can, for example, emit information on the orientation of the object to which it is fixed, upon request by the central processing unit. Advantageously, a bidirectional exchange of information between the central processing unit and a displacement detector can allow parameterising of the displacement detector (adapting to the type of object being monitored, in particular to the type of leaf; adapting predetermined values (thresholds), . . . ).

The housing of a displacement detector in accordance with the invention is advantageously adapted to be able to be fixedly attached to the monitored object. The housing advantageously comprises means for fixing to an object. The fixing means are particularly adapted so that the detector can be fully fixedly attached to the object so as to be able to detect accelerations, in particular impacts, and changes in orientation of the monitored object.

More particularly, said housing comprises means for fixing to an object such that detaching the displacement detector from the object requires displacing said housing with an acceleration and/or change in orientation which are suitable to be detected by the processing unit and, if need be, trigger an alarm. This allows an attempted removal or a removal of the detector to be detected.

In addition, advantageously and in accordance with the invention, a displacement detector in accordance with the invention is advantageously provided with an autonomous source of energy. Thus, a displacement detector in accordance with the invention is advantageously provided with a cell, whether rechargeable or not. Alternatively or in combination, it can be provided with a photovoltaic cell. A displacement detector in accordance with the invention is advantageously free of wires and thus can be freely and discretely fixed to any object.

A detector in accordance with the invention is particularly suitable to be able to operate for a long time only with the energy of a small cell of the button cell-type for example. In fact, the monitored objects are often objects which are stationary for a longer period of time than they are moving (work of art, leaf, etc.) such that for the majority of the time, the orientation signals are acquired at the low rate, thus allowing the energy consumed by a displacement detector in accordance with the invention to be limited.

The invention also relates to a method implemented in a device in accordance with the invention. It thus relates, in a first aspect, to a method for operating a displacement detector for an object, named monitored object, said displacement detector comprising:
  a housing,
  an accelerometer fixed to the housing and adapted to provide signals, named acceleration signals, representing an acceleration of the housing in at least one fixed direction of the housing,
  an orientation sensor fixed to the housing and adapted to provide signals, named orientation signals, representing the momentary orientation of at least one fixed direction of the housing,
  a memory comprising data representing:
    at least one predetermined value, named triggering value,
    at least one predetermined value, named scaling value,
  a unit for processing the acceleration signals and orientation signals,
characterised in that the processing unit:
  processes the acceleration signals so as to be able to identify, using said triggering value, a predetermined event, named triggering event, representing a variation in the acceleration of the housing,
  upon detection of a triggering event:
    performs, at least from the acceleration signals, a calculation for determining a value, named displacement energy, said calculation comprising at least one sum of accelerations over time,
    after a set time, named waiting time, from the triggering event has passed, acquires orientation signals provided by the orientation sensor representing the momentary orientation, named final orientation, of the housing,
    compares said displacement energy to said scaling value.

In accordance with another aspect, the invention relates to a method for operating a displacement detector for an object, named monitored object, said displacement detector comprising:
  a housing,
  an accelerometer fixed to the housing and adapted to provide signals, named acceleration signals, representing an acceleration of the housing in at least one fixed direction of the housing,
  an orientation sensor fixed to the housing and adapted to provide signals, named orientation signals, representing the momentary orientation of at least one fixed direction of the housing,
  a memory comprising data representing:
    at least one predetermined value, named triggering value,
    at least one predetermined value, named scaling value,
  a unit for processing the acceleration signals and orientation signals,
characterised in that the processing unit:
  processes the acceleration signals so as to be able to identify, using said triggering value, a predetermined event, named triggering event, representing a variation in the acceleration of the housing,
  upon detection of a triggering event:
    acquires orientation signals provided by the orientation sensor representing the momentary orientation, named initial orientation, of the housing,
    performs, at least from the acceleration signals, a calculation for determining a value, named displacement energy, said calculation comprising at least one sum of accelerations over time,
    after a set time, named waiting time, from the acquisition of the initial orientation has passed, acquires orientation signals provided by the orientation sensor representing the momentary orientation, named final orientation, of the housing,
    compares said displacement energy to said scaling value.

In addition, advantageously in a method in accordance with the invention, the processing unit acquires:
  acceleration signals provided by the accelerometer at a first sampling rate, named accelerometer rate,
  orientation signals provided by the orientation sensor at a second sampling rate, named low rate, with a value less than said accelerometer rate.

For a given processing unit, the energy is calculated for a set time such that the final position is always measured at a fixed time interval after the initial position has been measured.

In addition, advantageously and in accordance with the invention, the processing unit acquires, upon detection of a triggering event, orientation signals provided by the orientation sensor at a third sampling rate, named high rate, with a value greater than said low rate.

In a method in accordance with the invention, the processing unit then produces data representing a message, the content of which is based on the comparison between the final position and the initial position and/or based on the comparison between the displacement energy and the scaling value.

More particularly, the processing unit compares the difference between the final position and the initial position to a threshold value stored in the memory. When the difference is greater than this threshold value, this corresponds to a displacement of the monitored object with respect to its initial position.

In the case of a leaf, when the initial position is a closed position, this allows a detection to be made as to whether the acceleration experienced—one or more break-in impacts for example—has been followed by the leaf being opened.

Calculating the energy of the acceleration/impact to which the monitored object is subjected and comparing the initial position and the final position allow a double check to be carried out on the state of the leaf: in fact, the energy of an impact in theory allows a determination to be made as to whether the object has been displaced, the same applies for the comparison between the initial position and final position. Thus, in a method in accordance with the invention, the position of the monitored object after an acceleration, in particular an impact-type acceleration, is particularly reliable.

Thus, owing to processing of the acceleration signals, a displacement detector in accordance with the invention allows the detection of an attempted break-in even before a break-in relating to the monitored object, in particular a leaf, has occurred, and allows the confirmation, after such a detection, of whether or not the attempted break-in has resulted in an actual break-in.

The invention relates to a computer program comprising program code instructions for performing the steps of a method in accordance with the invention when the program is run on a computer, in particular on a device in accordance with the invention.

The invention relates in particular to a computer program comprising instructions for performing a method in accordance with the invention when the program is run by a device comprising at least one processing unit, in particular a device in accordance with the invention.

The invention relates to a computer program comprising computer program code instructions—in particular computer program code instructions stored on a computing system-useable medium—characterised in that it comprises computing system-readable programming means adapted to perform, when run by said computing system (in particular loaded into the memory thereof), a method in accordance with the invention with said computing system.

It relates to a computer program comprising computer program code instructions—in particular computer program code instructions stored on a computing system-useable medium—characterised in that it comprises computing system-readable programming means adapted to form, when run by said computing system, a device in accordance with the invention.

The invention relates to a storage medium on which a program in accordance with the invention is stored, as well as to a device in which such a program is stored.

The invention thus further relates to medium which can be used in a computing system, this medium comprising computer program code instructions stored on this medium and which can be used in a computing system, characterised in that it comprises computing system-readable programming means stored on this medium and adapted to form, when run by said computing system (in particular loaded into the memory thereof), a device in accordance with the invention.

The invention also relates to a device, a method and a computer program, a medium which are characterised in combination by all or some of the features mentioned above or below.

Figure 2:
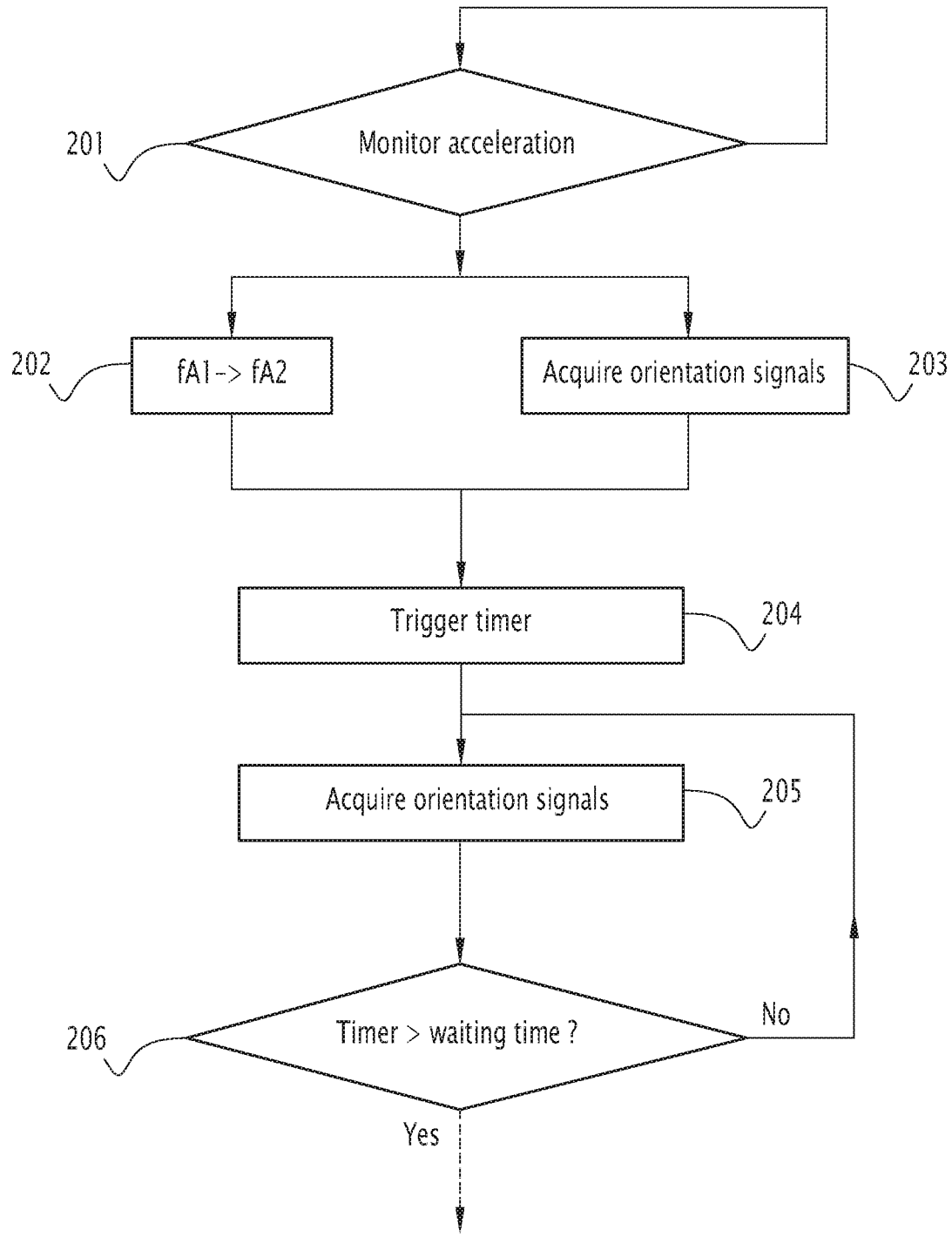
Figure 2:
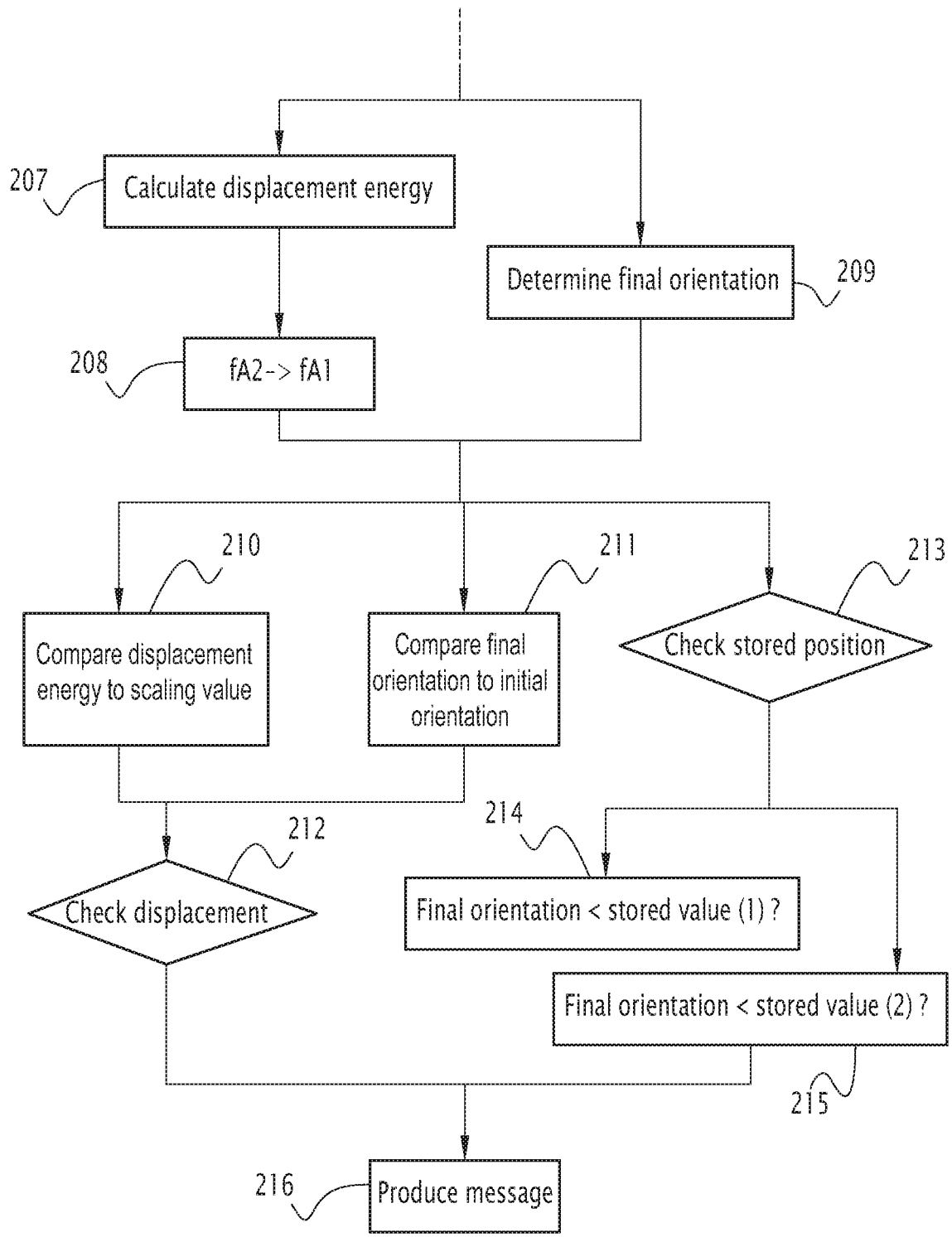
Figure 3:
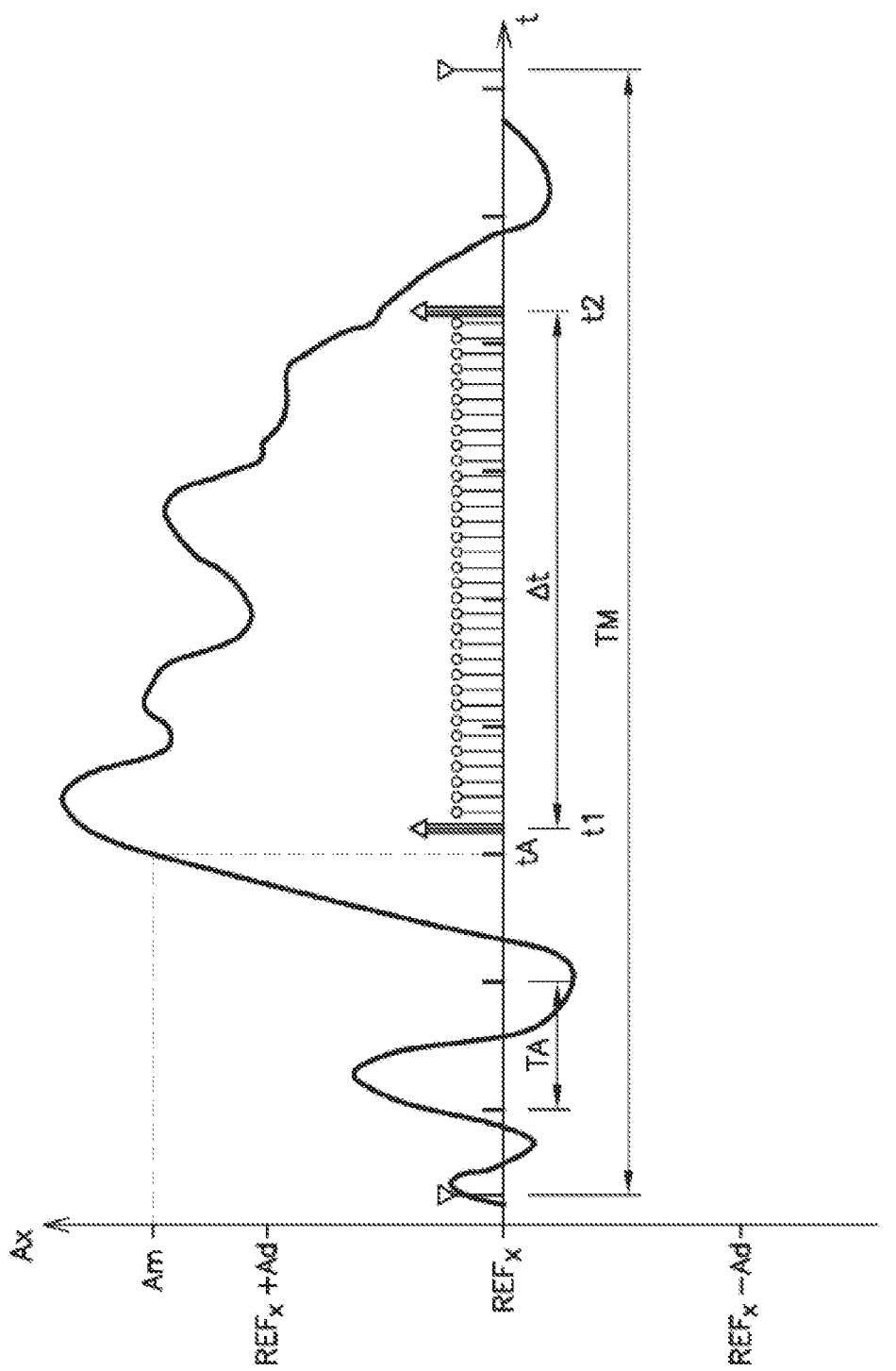

Other aims, features and advantages of the invention will become apparent upon reading the following description given by way of non-limiting example and which makes reference to the attached figures in which:

FIG. 1 is a schematic cross-sectional view of a position detector in accordance with the invention, FIG. 2 is an operating diagram of a method for operating a position detector in accordance with FIG. 1, FIG. 3 corresponds to a schematic representation of the acceleration on an axis x of a displacement detector in accordance with the invention in the event of an impact, as a function of time on the x axis, as well the acquisition of signals performed by a displacement detector in accordance with the invention upon such a triggering event.

A displacement detector 30 of a home-automation device in accordance with the invention comprises a housing 36 in which there is disposed an electronic circuit comprising a processing unit 31 for signals and data. The processing unit 31 is connected to an orientation sensor comprising a magnetometer 34. The processing unit is also connected to an accelerometer 33. In the particular embodiment illustrated in FIG. 1, the magnetometer 34 and the accelerometer 33 can be brought together on a single electronic chip.

The magnetometer 34 is a magnetometer with three axes which provides signals, named orientation signals, representing the momentary intensity of the local magnetic field in its three measuring directions which are fixed with respect to the housing 36 of the displacement detector 30. In general, the local magnetic field is the local terrestrial magnetic field, unless a powerful magnet has been deliberately placed close thereto, which may be advantageous for example to detect the position of a sliding leaf.

The processing unit 31 is further connected to a memory 32 adapted to be able to store digital data.

The memory 32 is adapted to store data representing at least three intensity values of the magnetic field (one for each measuring axis of the magnetometer 34), in particular corresponding to an initial orientation. The memory 32 is adapted to store data representing at least three acceleration values corresponding to the values REFx, REFy and REFz of the local gravity in each of the measuring axes of an accelerometer with three measuring axes.

The memory 32 can be of the RAM or ROM type or advantageously a combination of these two types of memory.

The processing unit 31 is further connected to a radio module 35 comprising an antenna adapted to be able to emit radiofrequency wireless signals, e.g. using the Wi-Fi® protocol.

The displacement detector 30 also comprises a cell 37 connected in a suitable manner to each of the components of the electronic circuit to supply them with electrical energy.

The electronic circuit is fixed to the housing 36, e.g. by screws 39 or by rivet sets.

FIG. 2 is a simplified operating diagram of the operation of a displacement detector in accordance with the invention, e.g. as shown in FIG. 1.

In step 201, in a displacement detector in accordance with the invention, the processing unit 31:
  acquires, at a rate fA1, the acceleration signals provided by the accelerometer 33 representing acceleration values on each measuring axis,
  calculates a difference between the acceleration value on each measuring axis and a reference value REFx, REFy, REFz of the local gravity,
  compares the absolute value of this difference to values, named triggering values, stored in the memory 32.

In particular, the processing unit 31 compares the gravity-corrected acceleration values represented by the acceleration signals on each measuring axis of the accelerometer 33 with three axes, with three triggering values corresponding to each measuring axis. The triggering values are selected, for example, such that the accelerations owing to usual vibrations of a closed leaf on its frame, such as those caused by the wind or people moving close-by, are of an absolute value below the detection threshold of a triggering event fixed by the triggering value.

If one of the gravity-corrected acceleration values on at least one axis is greater than a stored triggering value, the processing unit passes to steps 202 and 203. Otherwise, the processing unit continues in step 201.

Step 201 thus corresponds to a periodic monitoring of the acceleration of a monitored object.

In step 202, the processing unit passes from an acceleration rate fA1 for acquiring the acceleration signals provided by the accelerometer 33 to an alert rate fA2, greater than fA1, for acquiring acceleration signals. The acceleration rate fA1 is e.g. advantageously of the order of 5 Hz whilst the alert rate fA2 is e.g. advantageously of the order of 50 Hz. From step 202, the acceleration signals are advantageously stored in the memory. After step 202, the processing unit passes to step 204.

In step 203, the processing unit:
  passes from a low rate fM1 for acquiring the orientation signals provided by the magnetometer 34 to a high rate fM2, greater than fM1, for acquiring orientation signals,
  acquires, at the high rate, orientation signals corresponding to at least four successive momentary intensity values of the local magnetic field in each measuring direction of the magnetometer 34,
  determines an orientation, named initial orientation, of the housing 36 from the average of the four previously acquired orientation values in each direction with respect to a reference orientation,
  passes from the high rate fM2 for acquiring orientation signals back to the low rate fM1 for acquiring orientation signals.

The rate fM1 is e.g. advantageously of the order of 0.2 Hz whilst the rate fM2 is e.g. advantageously of the order of 50 Hz.

The initial orientation is stored in the memory, e.g. in the form of an angular value. If the monitored object is a leaf, the reference orientation corresponds e.g. to a closed position of the leaf in its frame. The initial orientation is determined with respect to this reference orientation, this is advantageously an angle with respect to this reference orientation, in particular in the case of pivoting leaves.

The processing unit then passes to step 204.

In step 204, the processing unit 31 triggers a timer and then passes to step 205.

In step 205, the processing unit acquires the acceleration signals provided by the accelerometer at the rate fA2.

The processing unit then passes to step 206.

In step 206, the processing unit compares the value of the timer triggered in step 204 with a set time value, named waiting time, stored in the memory 32. In this example, said waiting time is equal to said calculating time. Until this waiting time has passed, the processing unit continues to acquire acceleration signals (step 205).

When the waiting time has passed, the processing unit passes to steps 207 and 209.

In step 207, the processing unit calculates a value, named displacement energy, from the acceleration signals acquired in step 205 on each axis of said accelerometer.

Then, the processing unit stores the thus determined displacement energy value in a memory 32.

The processing unit then passes to step 208.

In step 208, the processing unit passes from the alert rate fA2 back to the acceleration rate fA1 for acquiring acceleration signals, and then passes to steps 210, 211, 213.

In step 209, the processing unit:
  passes from the low rate fM1 to the high rate fM2 for acquiring orientation signals,
  acquires, at the high rate, orientation signals corresponding to at least four successive momentary intensity values of the local magnetic field in each measuring direction of the magnetometer 34,
  determines an orientation, named final orientation, of the housing 36 from the average of the four previously acquired orientation values in each direction with respect to a reference orientation,
  passes from the high rate fM2 for acquiring orientation signals back to the low rate fM1 for acquiring orientation signals.

The final orientation is stored in the memory, e.g. in the form of an angular value. If the monitored object is a leaf, the reference orientation corresponds e.g. to a closed position of the leaf in its frame. The initial orientation is determined with respect to this reference orientation, this is advantageously an angle with respect to this reference orientation, in particular in the case of pivoting leaves.

The processing unit then passes to steps 210, 211, 213. In step 210, the processing unit 31 compares the displacement energy calculated in step 207 with at least one value, named scaling value, stored in the memory 32. The scaling values are selected such that displacement energies less than said scaling values correspond to accelerations or impacts which are deemed to be normal for said monitored leaf: e.g. small displacements caused by the wind on a leaf mounted with non-zero clearance. Advantageously, the processing unit comprises several scaling values so as to be able to determine the level of one or more impacts and/or accelerations received by the monitored object. For example, the memory comprises nine distinct scaling values so as to be able to determine ten levels of displacement energy. Advantageously, at least one of the scaling values represents a situation in which the monitored object has been displaced—in particular in the case of a leaf, a situation in which the leaf has been opened by a break-in.

The processing unit then passes to step 212.

In step 211, the processing unit compares the final orientation and the initial orientation by a difference between the final orientation and the initial orientation.

The difference can be zero: i.e. the object has not been displaced despite the measured acceleration. This is for example the case in the event of a break-in impact on a leaf which does not result in the leaf being opened. The difference can be positive or negative: i.e. the monitored object has been displaced. In the case of a leaf, the sign of this difference allows the identification of whether the leaf has passed from an open position to a closed position or from a closed position to an open position, in particular when a reference position corresponding to a closed position is stored in the memory.

The processing unit then passes to step 212.

In step 212, the processing unit compares the result of the comparison of the displacement energy with scaling values and the result of the difference between the final orientation and the initial orientation. This step allows the result of the calculation of said displacement energy to be correlated with the initial and final position measurements of the monitored object. Thus, this step allows verification that:

the monitored object has not been displaced, the displacement energy not being of a sufficiently high value to represent one or more accelerations (and/or impacts) having resulted in the displacement of the monitored object, and the difference between the final orientation and the initial orientation being less than a predetermined threshold, the monitored object has been displaced, the displacement energy being of a sufficiently high value to represent one or more accelerations (and/or impacts) having resulted in the displacement of the monitored object, and the difference between the final orientation and the initial orientation being greater than a predetermined threshold.

The processing unit then passes to step 216.

In step 213, the processing unit verifies, in the memory, the position of the monitored object which was stored in the memory prior to step 201. In the case of a leaf, this corresponds for example to the "open" or "closed" state of the leaf. If the monitored object was in the reference position ("closed" state of a leaf), the processing unit passes to step 215. If the monitored object was not in the reference position ("open" state of a leaf), the processing unit passes to step 214.

In step 214, the processing unit compares the final orientation with a value stored in the memory, below which the monitored object is considered to have returned to the reference position. For example, in the case of a door, this value is of the order of 5°.

The processing unit then passes to step 216.

In step 215, the processing unit compares the final orientation with a value stored in the memory, above which the monitored object is considered to have been displaced out of the reference position. For example, in the case of a door, this value is of the order of 10°. The processing unit thus determines, in step 214 or step 215, whether the position of the object has significantly changed following an impact detected in step 201.

The processing unit then passes to step 216.

In step 216, the processing unit produces a message based on the results of steps 212 and 214 or 215. Such a message is, for example, emitted via the antenna 35 to a central processing unit of a home-automation alarm device. The message contains, for example, information such as a level of displacement energy and a state representing a position of the monitored object ("closed" or "open" state of a leaf). Based on the content of the message and, if need be, an operating mode of the central processing unit, the central processing unit can trigger alarm means such as a siren for example.

In the rare cases where the displacement energy is of a sufficiently high value to represent one or more accelerations (and/or impacts) which must have resulted in the displacement of the monitored object but the difference between the final orientation and the initial orientation is less than a predetermined threshold—i.e. the monitored object has not been displaced—the central processing unit triggers an anti-intrusion alarm but can modify the predetermined threshold level.

The processing unit then returns to step 201.

A method in accordance with the invention is particularly efficient in terms of the energy consumed by the electronic components. In fact, the majority of the monitored objects are stationary for most of the time, such that the processing unit spends most of the time running step 201 with a low acquisition rate fA1 such that very little power is drawn from the cell 37. In addition, the magnetometer operates at the high rate fM2 only in very rare cases and for extremely short time periods (cf. steps 203 and 209). The lifespan of the cell 37 is thus extended by the invention.

FIG. 3 shows a triggering event such as an impact on a door detected by a displacement detector of a home-automation device in accordance with the invention.

In normal operation, the displacement detector acquires:
acceleration signals at time intervals $T_A$ ($T_A$=1/fA1) represented by the short bars in FIG. 3,
orientation signals at time intervals $T_M$ (TM=1/fM1) represented by the long bars with a downwardly-pointing triangle on top in FIG. 3.

The low rate fM1 for acquiring orientation signals is less than the acceleration rate fA1 for acquiring acceleration signals.

At time $t_A$, an acceleration value of value Am on one measuring axis x is detected which is greater than the triggering value REFx+Ad for this measuring axis x.

Immediately thereafter, at time t1, the processing unit acquires, at a high rate fM2, a plurality of successive orientation signals—independently of the acquisition period TM linked to the low rate fM1—and determines an initial orientation θ1 of the door. These acquisitions are shown by a long bar with an upwardly-pointing triangle on top in FIG. 3.

The processing unit then acquires acceleration signals at an alert rate fA2, the acquisitions at this alert rate fA2 being shown by the bars with a circle on top in FIG. 3. The acceleration signals are acquired at the high rate fA2 during at least one waiting time ΔT which runs from time t1 to a later time t2.

This high alert rate allows a fine image of the acceleration to which the door and displacement detector are subjected to be obtained. In FIG. 3, the acceleration to which the displacement detector is subjected is shown by a continuous curve.

In this example, the calculating time is equal to the waiting time ΔT.

Once the waiting time ΔT has passed, the processing unit acquires, at time t2 and at said high rate fM2, a plurality of successive orientation signals and determines a final orientation θ2 of the door. These acquisitions are shown by a long bar with an upwardly-pointing triangle on top in FIG. 3.

The processing unit then passes back to sampling rates fM1 (low rate for the orientation signals) and fA1 (acceleration rate for the acceleration signals).

The acquisitions of acceleration signals during the waiting time ΔT are then processed by the processing unit to calculate a value, named displacement energy.

Similarly, the initial orientation and the final orientation can be determined by the processing unit after time t2 from the orientation signals acquired at times t1 and t2.

The processing unit then compares said displacement energy with one or more scaling values, as well as said final orientation θ2 with said initial orientation θ1.

The invention can comprise numerous other embodiment variations, not illustrated.

The invention claimed is:

1. Home-automation device comprising at least one displacement detector for an object, named monitored object, comprising:
   a housing,
   an accelerometer fixed to the housing and adapted to provide signals, named acceleration signals, representing an acceleration of the housing in at least one fixed direction of the housing,
   an orientation sensor fixed to the housing and adapted to provide signals, named orientation signals, representing a momentary orientation of at least one fixed direction of the housing,
   a memory comprising data representing:
      at least one predetermined value, named triggering value,
      at least one predetermined value, named scaling value,
   a processing unit for the acceleration signals and orientation signals,
   wherein the processing unit is programmed to:
   be able to identify a predetermined event, named triggering event, representing a variation in the acceleration of the housing, at least from the acceleration signals and said triggering value,
   upon detection of a triggering event:
      perform, at least from the acceleration signals, a calculation for determining a value, named displacement energy, said calculation comprising at least one sum of accelerations over time,
      after a set time, named waiting time, from the triggering event has passed, acquire orientation signals provided by the orientation sensor representing the momentary orientation, named final orientation, of the housing,
      compare said displacement energy to said scaling value.

2. Device according to claim 1, wherein the processing unit is programmed to acquire, upon detection of a triggering event, orientation signals provided by the orientation sensor representing the momentary orientation, named initial orientation, of the housing, and to compare said final orientation and said initial orientation.

3. Device according to claim 1, wherein calculating said displacement energy comprises:
   a moving acceleration average from a plurality of acceleration signals,
   a difference between the moving acceleration average and a predetermined value, named continuous value, stored in the memory in the form of data,
   a quadratic sum of a plurality of differences between a plurality of time-offset moving acceleration averages and said continuous value.

4. Device according to claim 1, wherein the processing unit is programmed to acquire:
   acceleration signals provided by the accelerometer at a first sampling rate, named accelerometer rate,
   orientation signals provided by the orientation sensor at a second sampling rate, named low rate, with a value less than said accelerometer rate.

5. Device according to claim 1, wherein the orientation sensor comprises a magnetometer fixed to the housing and adapted to provide orientation signals representing the momentary orientation of at least one fixed direction of the housing with respect to a local terrestrial magnetic field.

6. Device according to claim 1, wherein the accelerometer is an accelerometer with three axes adapted to provide the acceleration signals representing momentary acceleration measurements of the housing with a reference to Earth.

7. Device according to claim 1, wherein said scaling value is adapted such that a displacement energy value greater than said scaling value corresponds to an impact of a given intensity on the monitored object.

8. Device according to claim 1, wherein:
   the memory comprises data representing a plurality of predetermined distinct scaling values,
   the processing unit is programmed to compare said displacement energy with a plurality of scaling values.

9. Device according to claim 2, wherein:
   the memory comprises data representing a plurality of predetermined distinct scaling values,
   the processing unit is programmed to compare said displacement energy with a plurality of scaling values.

10. Device according to claim 2, wherein calculating said displacement energy comprises:
    a moving acceleration average from a plurality of acceleration signals,
    a difference between the moving acceleration average and a predetermined value, named continuous value, stored in the memory in the form of data,
    a quadratic sum of a plurality of differences between a plurality of time-offset moving acceleration averages and said continuous value.

11. Device according to claim 4, wherein the processing unit is programmed to acquire, upon detection of a triggering event, orientation signals provided by the orientation sensor at a third sampling rate, named high rate, with a value greater than said low rate.

12. Device according to claim 4, wherein the processing unit is programmed to acquire, upon detection of a triggering event, acceleration signals provided by the accelerometer at a fourth sampling rate, named alert rate, with a value greater than said accelerometer rate.

13. Device according to claim 9, wherein the processing unit is programmed to perform an operation, named correlating operation, comprising at least one comparison of the result of the comparison between the final orientation and the initial orientation, and the result of the comparison between said displacement energy and a plurality of scaling values.

14. Device according to claim 9, wherein calculating said displacement energy comprises:
    a moving acceleration average from a plurality of acceleration signals,
    a difference between the moving acceleration average and a predetermined value, named continuous value, stored in the memory in the form of data,
    a quadratic sum of a plurality of differences between a plurality of time-offset moving acceleration averages and said continuous value.

15. Device according to claim 13, wherein calculating said displacement energy comprises:
    a moving acceleration average from a plurality of acceleration signals,
    a difference between the moving acceleration average and a predetermined value, named continuous value, stored in the memory in the form of data,
    a quadratic sum of a plurality of differences between a plurality of time-offset moving acceleration averages and said continuous value.

16. Method for operating a home-automation device comprising at least one displacement detector, said displacement detector comprising:
- a housing,
- an accelerometer fixed to the housing and adapted to provide signals, named acceleration signals, representing an acceleration of the housing in at least one fixed direction of the housing,
- an orientation sensor fixed to the housing and adapted to provide signals, named orientation signals, representing the momentary orientation of at least one fixed direction of the housing,
- a memory comprising data representing:
  - at least one predetermined value, named triggering value,
  - at least one predetermined value, named scaling value,
- a processing unit for the acceleration signals and orientation signals,
- wherein the processing unit:
- processes the acceleration signals so as to be able to identify, using said triggering value, a predetermined event, named triggering event, representing a variation in the acceleration of the housing,
- upon detection of a triggering event:
  - performs, at least from the acceleration signals, a calculation for determining a value, named displacement energy, said calculation comprising at least one sum of accelerations over time,
  - after a set time, named waiting time, from the triggering event has passed, acquires orientation signals provided by the orientation sensor representing the momentary orientation, named final orientation, of the housing,
  - compares said displacement energy to said scaling value.

17. Method according to claim 16, wherein the processing unit, upon detection of the triggering event, acquires orientation signals provided by the orientation sensor representing the momentary orientation, named initial orientation, of the housing, and compares said final orientation and said initial orientation.

18. Method according to claim 16, wherein the processing unit acquires:
- acceleration signals provided by the accelerometer at a first sampling rate, named accelerometer rate,
- orientation signals provided by the orientation sensor at a second sampling rate, named low rate, with a value less than said accelerometer rate.

19. Storage medium which can be used in a computing system on which there is stored a computer program comprising program code instructions for performing the steps of a method according to claim 16 when the program is run by a computing system.

20. Method according to claim 18, wherein, immediately after detection of an acceleration value greater than said triggering value, the processing unit acquires orientation signals provided by the orientation sensor at a third sampling rate, named high rate, with a value greater than said low rate.

* * * * *